Figure 1:
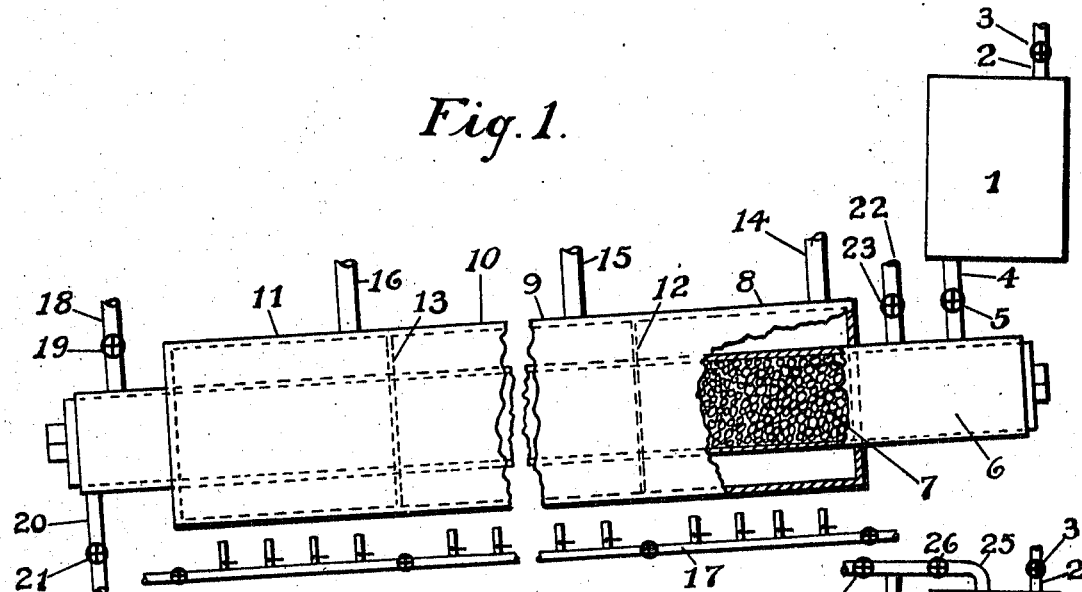

C. ELLIS.
HYDROGENATING FATTY MATERIALS.
APPLICATION FILED OCT. 23, 1911.

1,026,156.

Patented May 14, 1912.
2 SHEETS—SHEET 1.

WITNESSES:
B. M. Ellis.
O. J. Hawthorn

INVENTOR
Carleton Ellis

UNITED STATES PATENT OFFICE.

CARLETON ELLIS, OF MONTCLAIR, NEW JERSEY, ASSIGNOR TO NEW JERSEY TESTING LABORATORIES, A CORPORATION OF NEW JERSEY.

HYDROGENATING FATTY MATERIALS.

1,026,156.  Specification of Letters Patent. Patented May 14, 1912.

Application filed October 23, 1911. Serial No. 656,100.

*To all whom it may concern:*

Be it known that I, CARLETON ELLIS, a citizen of the United States, and a resident of Montclair, in the county of Essex and State of New Jersey, have invented certain new and useful Improvements in Hydrogenating Fatty Materials, of which the following is a specification.

This invention relates to a method of treating fatty materials especially unsaturated fats and fatty glycerids and the like by means of hydrogen or hydrogen adding substances for the purpose of saturating, to a greater or less extent, such unsaturated bodies; in order thereby to raise the melting point or otherwise improve the quality thereof; and is concerned particularly with the continuous manufacture of hydrogen saturated compounds, as distinguished from intermittent manufacture, especially in conjunction with the employment of catalytic bodies of various sorts capable of accelerating the absorption of hydrogen; all as more particularly hereinafter described and as claimed.

The addition of hydrogen to unsaturated organic compounds as brought about by the catalytic action of various metallic compounds, oxids and the like has been the subject of many investigations, which embrace the work of Sabatier and Senderens, Mailhe, Henle, Willstätter and Mayer, Paal and Amberger, Paal and Gerum, Paal and Roth, Paal and Hartmann, Ipatiew, Padoa and Carughi, Ipatiew and Philipow, Jakowlew, Rakitin and others.

In the present invention no claim is laid to the broad method of reducing unsaturated fatty material by hydrogen, but rather to a special procedure or treatment involving the handling of large quantities of the material in a cheap and efficient manner; said procedure including the production of a traveling stream of fatty material undergoing reduction and the treatment of such stream under varied thermal and other conditions at different points along its line to produce essentially saturated fatty material.

It is the object of the present invention to provide a simple, cheap and ready method of forming saturated fatty material, which shall be free from the disadvantages of the older methods and shall have certain new and valuable advantages, giving enhanced yields with a simpler, surer and less laborious operation.

In the preferred form of my invention involving such operation in a continuous way, the fatty material, as for example, oleic acid, is passed through a conduit, preferably of great length, in the form of a traveling stream which progressively advances against a countercurrent of hydrogen or hydrogen containing gas, as water gas for instance. The conduit may be interiorly lined or coated with catalytic material, including such catalysts as nickel, copper, iron, palladium, platinum, cobalt, chromium, manganese, titanium, molybdenum, vanadium and the like, in a finely divided state or in the forms of their oxids etc.

When water gas is used as the gaseous reducing medium it may be passed, as stated in a direction counter to that of the oleic acid or other fatty material, which is caused to flow for example along a slightly inclined conduit, which it may only partially fill. The space above the stream of progressively-advancing oil may thus be occupied by the water gas and from this gas the hydrogen is gradually removed so that when the gas finally discharges from the conduit it has become largely depleted of its original content of hydrogen. This brings into play a very important feature on which depends rapidity of operation and satisfactory consummation of the reaction. Water gas is one of the cheapest sources of hydrogen and after its hydrogen has been extracted more or less the residual gas may be used for heating or lighting purposes without waste. If water gas is introduced into a vessel containing oil and a catalyst and heated the hydrogen is absorbed rapidly at first, then more slowly as the oil becomes somewhat saturated. Now as the avidity of the oil for hydrogen decreases with increasing absorption of hydrogen, the partial pressure of hydrogen in the circumambient gas decreases, making completion of the reaction difficult and slow. In the present preferred form of this invention fresh water gas with its full complement of hydrogen comes in contact with the nearly-saturated oil thus completing the reaction, while the fresh oil comes in contact with the gas of reduced hydrogen content, from which however a substantial quantity of the hydrogen is extracted due to the greater avidity of the fresh oil for the hydrogen.

Another feature of importance is the possibility of regulating the heating to suit the different stages of reaction. The absorption of hydrogen appears to be progressive as regards its union in a compound containing for example two double bonds. The first bond being satisfied under conditions of heating best suited therefor, the second bond is then treated under conditions specific therefor, as regards the absorption of hydrogen. Obviously this would be a very complicated matter if carried out in a closed vessel intermittently, but in the continuous method included in this invention such specific thermal or other treatment is made possible. Depending on the oil or grease in hand, the heating may be increased progressively or decreased progressively or otherwise, as the fatty material flows along the said conduit.

By reference to the drawings, the manner in which the preferred embodiment of this invention may be carried out, is diagrammatically depicted.

Figure 2:
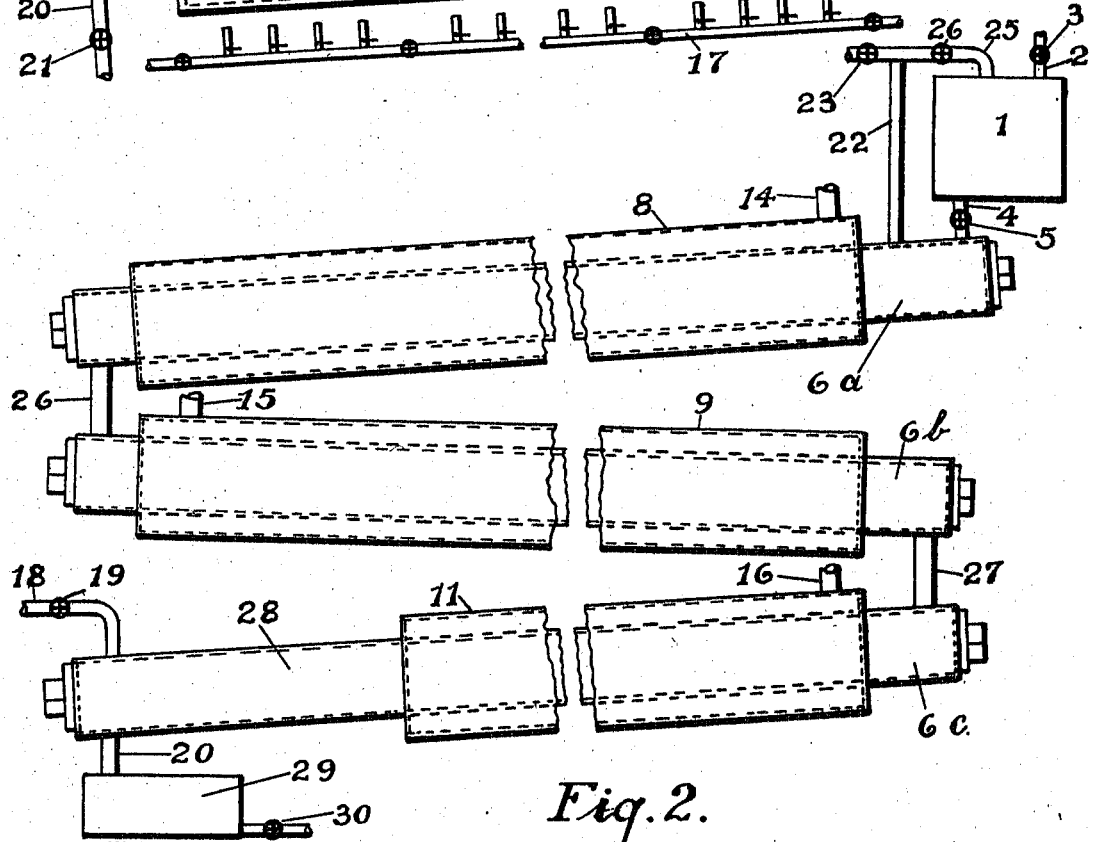
Figure 3:
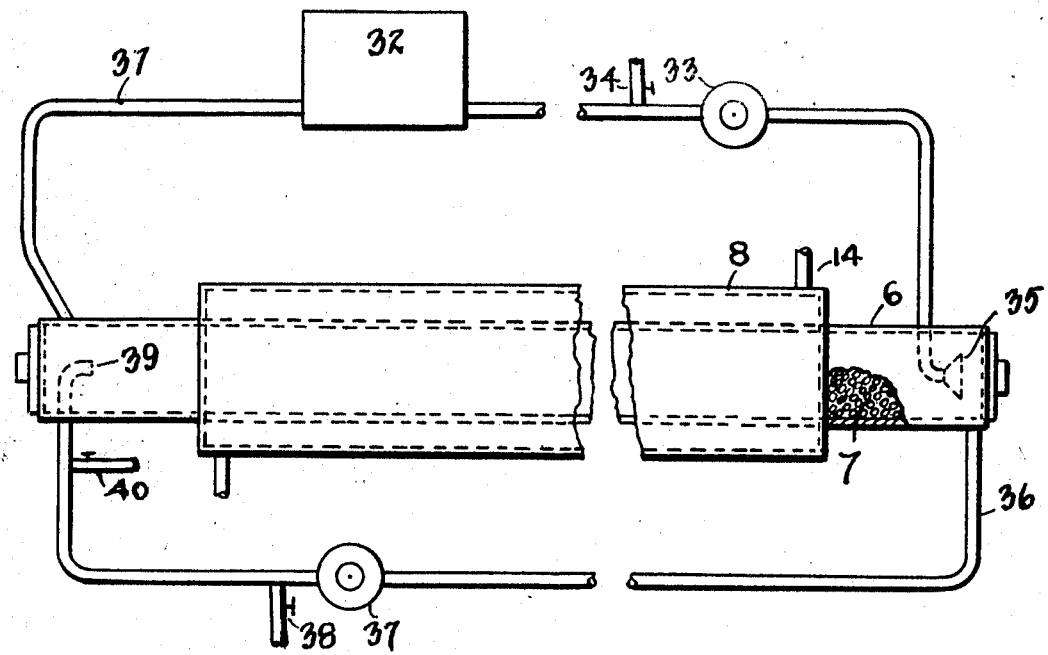

In the drawings, Figure 1 shows in longitudinal elevation a treating conduit having means for differentially heating its different parts. A portion of the conduit is shown in section. Fig. 2 is a longitudinal elevation of apparatus substantially similar to that shown in Fig. 1, except that it is somewhat more compact. Fig. 3 is an elevation of an apparatus having special circulating means. A portion of this apparatus also is shown in section.

Like reference characters designate like parts in the several drawings.

In the drawings, 1 is an oil supply tank, having the inlet pipe 2 controlled by the valve.

4 is an outlet pipe controlled by the valve 5, and serving to connect the tank 1 with a conduit 6. The latter carries a stationary mass of catalytic material, such as nickel, platinum and the like, shown at 7. The conduit is surrounded by a heating jacket indicated by 8, 9, 10, and 11, the septa 12 and 13 serving to form separate chambers which may be differentially heated. Vents are shown at 14, 15 and 16. A gas main 17 carrying burners provides means for heating the said chambers.

18 is a gas inlet pipe controlled by the valve 19 and 20 is an oil outlet pipe having the valve 21.

22 is a gas outlet pipe having the valve 23.

In Fig. 2 the conduit is made in sections 6ª, 6ᵇ, and 6ᶜ, which are superposed and connected by the pipes 26 and 27. A reservoir 29 is provided for the oil discharging from the lower section. This reservoir has an outlet pipe provided with the valve 30. The tank 1 of this figure communicates by the pipe 25, controlled by the valve 26, with the gas outlet pipe 22, to enable oil to flow more readily from the tank 1 to the conduit 6ª when high pressure is employed in the latter.

The operation of the apparatus as shown in Figs. 1 and 2 is as follows:—Oily material containing unsaturated fatty bodies is placed in the tank 1 and is allowed to flow slowly into the conduit 6 or 6ª respectively. Hydrogen gas or water gas is admitted through the pipe 18 as a counter-current; that is to say, the hydrogen travels in a direction contrary to the traveling liquid stream of oil. The conduit is inclined more or less from the horizontal to secure any desired rate of travel of the oil stream. The latter flows past the stationary mass of catalytic material 7 while contacting with the counter-current of hydrogen. The heating jackets may be filled with paraffin wax or a fusible alloy maintained at the requisite temperature. The treated oil discharges at the lower end of the conduit through the pipe 20, and the spent or excess gas is removed by the pipe 22. When using a nickel catalyzer and differentially heating the conduit, the temperature in 6ª, may, for example, be 150° C.; in 6ᵇ, 165° C.; and in 6ᶜ, 180° C., when converting oleic acid or olein into stearic acid or stearin, respectively. According to the fatty material under treatment the pressure likewise may be varied to suit the particular requirements, although in the present process, such is the correlative action of the various elements that operation at ordinary atmospheric pressure generally is sufficient.

A variation of the process may be practised when hydrogen, instead of water gas is used. This consists in passing the hydrogen through the conduit and allowing the residual or unconsumed gas to reënter the lower part of the conduit so that the gas travels a cyclic path; thus a more rapid flow of the gas is created which somewhat favors absorption.

Fig. 3 shows apparatus for carrying out this modification of the process, in which case 6 is a conduit shown horizontally disposed but which may be inclined to any extent desired. The catalyzer is shown at 7, and the heating jacket is designated by 8. 31 is a pipe for conveying gas, interposed in which is the washer or purifier 32 and the pump 33. A gas supply inlet is shown at 34. A pipe 36, for conveying oil, connects one end of the conduit with the other end. Interposed in the oil pipe is a pump 37. At 38 is an outlet for the finished oil. The oil enters the apparatus at 39, while hydrogen gas enters at the opposite end through the distributing device 35. The oil travels to the hydrogen inlet end of the conduit and is withdrawn by the operation of the pump 37. Treated oil is removed at 38 and fresh oil may be introduced at 40. The hydrogen gas travels in a direction contrary to the oil and is absorbed, more or less, by the oil. The excess gas passes from the conduit into the pipe 31, through the washer 32 and is then through the pump 33 back into the conduit at 35.

What I claim is:—

1. The process of adding hydrogen to oily material containing unsaturated fatty bodies which comprises forming of said material a traveling liquid stream of great length, in causing said stream to flow along a passage way carrying a stationary mass of catalytic material throughout its length, in simultaneously bringing water gas into contact with said stream as a counter current, whereby gas of maximum hydrogen content comes in contact with that portion of said stream containing a minimum of unsaturated fatty bodies, and in differentially heating said stream in different parts thereof; whereby saturated fatty material is produced in a continuous manner.

2. The process of adding hydrogen to oily material containing unsaturated fatty bodies which comprises forming of said material a traveling liquid stream of considerable length, in causing said stream to flow along a passage way carrying a stationary mass of catalytic material substantially throughout its length, in simultaneously bringing a counter current of hydrogen-containing gas into contact with said stream, whereby gas of maximum hydrogen content comes in contact with that portion of said stream containing a minimum of unsaturated bodies, and in differentially heating said stream in different parts thereof; whereby saturated fatty material is produced in a continuous manner.

3. The process of adding hydrogen to oily material containing unsaturated fatty bodies which comprises forming of said material an unbroken traveling liquid stream, in causing said stream to flow past a stationary mass of catalytic material and in simultaneously bringing a current of hydrogen-containing gas into contact with said stream; whereby saturated fatty material is produced.

4. The process of adding hydrogen to oily material containing unsaturated fatty bodies which comprises forming of said material an unbroken traveling liquid stream, in causing said stream to flow past a stationary mass of catalytic material, and in simultaneously bringing a current of hydrogen into contact with said stream; whereby saturated fatty material is produced.

5. The process of adding hydrogen to oily material containing unsaturated fatty bodies which comprises forming of said material an unbroken traveling liquid stream, in causing said stream to flow past a stationary mass of catalytic material under thermal conditions adapted to the absorption of hydrogen, and in simultaneously bringing a current of hydrogen into contact with said stream; whereby saturated fatty material is produced.

6. The process of adding hydrogen to oily material containing unsaturated fatty bodies which comprises forming of said material a traveling liquid stream, in causing said stream to flow past a stationary mass of catalytic material under thermal conditions adapted to the absorption of hydrogen, and in simultaneously bringing a counter-current of a hydrogen-containing gas into contact with said stream; whereby saturated fatty material is produced.

7. The process of adding hydrogen to oily material containing unsaturated fatty bodies which comprises forming of said material a traveling liquid stream, in causing said stream to flow past a stationary mass of catalytic material under thermal conditions adapted to the absorption of hydrogen, and in simultaneously bringing a counter-current of hydrogen into contact with said stream, whereby saturated fatty material is produced.

8. The process of adding hydrogen to oily material containing unsaturated fatty bodies which comprises forming of said material a liquid traveling stream, in causing said stream to flow past a stationary mass of catalytic material, in differentially heating said stream in different parts thereof, and in simultaneously bringing a counter-current of hydrogen into contact with said stream; whereby saturated fatty material is produced.

Signed at Montclair in the county of Essex and State of New Jersey this 19th day of October A. D. 1911.

CARLETON ELLIS.

Witnesses:
 CHAS. WRIGHT,
 BIRDELLA M. ELLIS.